United States Patent
Nedachi et al.

(10) Patent No.: US 8,287,432 B2
(45) Date of Patent: Oct. 16, 2012

(54) CLUTCH CONTROL SYSTEM FOR TRANSMISSION

(75) Inventors: Yoshiaki Nedachi, Saitama (JP); Yoshiaki Tsukada, Saitama (JP); Takashi Ozeki, Saitama (JP); Hiroyuki Kojima, Saitama (JP); Kazuyuki Fukaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1022 days.

(21) Appl. No.: 12/260,739

(22) Filed: Oct. 29, 2008

(65) Prior Publication Data

US 2009/0131218 A1 May 21, 2009

(30) Foreign Application Priority Data

Nov. 21, 2007 (JP) .................. 2007-301586

(51) Int. Cl.
*B60W 10/02* (2006.01)
*B60W 10/10* (2012.01)
*F16D 25/10* (2006.01)
*F16D 48/06* (2006.01)
*F16H 61/06* (2006.01)
*F16H 59/42* (2006.01)

(52) U.S. Cl. ............... 477/175; 477/180; 192/85.63; 192/48.601

(58) Field of Classification Search ........... 477/175, 477/180; 192/85.63
See application file for complete search history.

(56) References Cited

U.S. PATENT DOCUMENTS

| | | | |
|---|---|---|---|
| 6,090,008 A * | 7/2000 | Hoshiya et al. | 477/180 |
| 7,487,864 B2 * | 2/2009 | Kohlhaas et al. | 192/48.601 |
| 2003/0045988 A1 | 3/2003 | Suzuki et al. | |
| 2008/0128239 A1 * | 6/2008 | Ogasawara | 192/85 R |
| 2008/0182722 A1 * | 7/2008 | Colvin et al. | 477/180 |

FOREIGN PATENT DOCUMENTS

| | | |
|---|---|---|
| EP | 0309591 A1 | 4/1989 |
| JP | 2001-141045 A | 5/2001 |

* cited by examiner

*Primary Examiner* — Justin Holmes
*Assistant Examiner* — Jacob S Scott
(74) *Attorney, Agent, or Firm* — Birch, Stewart, Kolasch & Birch, LLP (57) ABSTRACT

A clutch control system for a twin-clutch type automatic/manual transmission AMT includes a hydraulic pump for driving a first clutch and a second clutch and oil passages for transmitting oil pressures and an AMT control unit for controlling the supply of oil pressures into the oil passages. Upon detection of an engine starting operation, the AMT control unit performs an initial preparatory operation in which the oil pressures are supplied into the oil passages at different timings so as to fill up the oil passages with a working oil, thereby completing the preparations for driving of the clutches. When the oil pressure is supplied into the oil passage after a predetermined oil pressure is generated in the oil passage, the period of time taken for a first speed gear to become usable is shortened, whereby a swift vehicle starting after the starting of the engine can be achieved.

20 Claims, 4 Drawing Sheets

CLUTCH CONTROL SYSTEM FOR TRANSMISSION

CROSS-REFERENCE TO RELATED APPLICATIONS

The present application claims priority under 35 USC 119 to Japanese Patent Application No. 2007-301586 filed on Nov. 21, 2007 the entire contents of which are hereby incorporated by reference.

BACKGROUND OF THE INVENTION

1. Field of the Invention

The present invention relates to a clutch control system for a transmission. More particularly, to a clutch control system for a transmission which can appropriately perform preparations for driving a plurality of hydraulic clutches driven by oil pressures supplied from a hydraulic pump, at an engine starting time.

2. Description of Background Art

Hitherto, there has been known a transmission which has a hydraulic pump driven attendantly on the rotation of a crankshaft and in which connection/disconnection of a clutch is controlled by an oil pressure generated by the hydraulic pump. In such a hydraulic type clutch, when the supply of the oil pressure is stopped attendantly on stopping of the engine, a working oil filling up an oil passage for the purpose of transmitting the oil pressure may be lost little by little from the oil passage due to leakage through gaps present in lubricated parts, leakage from hydraulic devices, or the like. At the time of first driving the clutch by starting the engine under the condition where the working oil has been partly lost from the oil passage, even if the oil pressure is supplied from the hydraulic pump according to a clutch driving command, it would take a little time for the oil passage to be again filled up with the working oil. As a result, at the time of first driving the clutch after the starting of the engine, an operational delay may be generated in relation to the driving command.

Japanese Patent Laid-Open No. 2001-141045 discloses a clutch control system for a transmission having a plurality of clutches corresponding to a plurality of gear speeds, wherein at an engine starting time, an oil pressure generated by a hydraulic pump is automatically supplied into oil passages, whereby the oil passages are filled up with the working oil before a clutch driving command is issued, and a delay in clutch operation is prevented from being generated.

In the technology according to Japanese Patent Laid-Open No. 2001-141045, however, in order to fill up the oil passages connected to the plurality of clutches with the working oil, the respective times to supply the oil pressures into the oil passages are computed from pipeline volume, engine speed and oil temperature, so that a complicated control is needed.

Figure 5A:
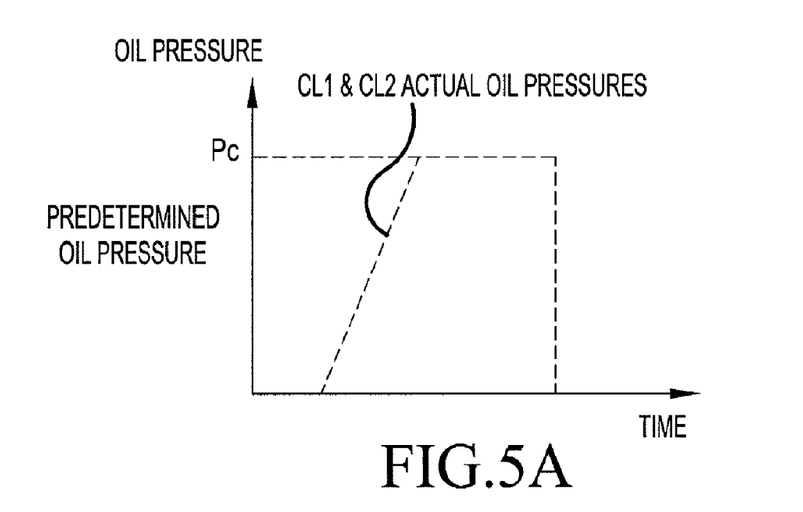
FIGS. 5(a) and 5(b) show graphs illustrating oil pressure variations in the case where oil pressures are supplied to CL1 and CL2 at the same time.
Figure 5B:
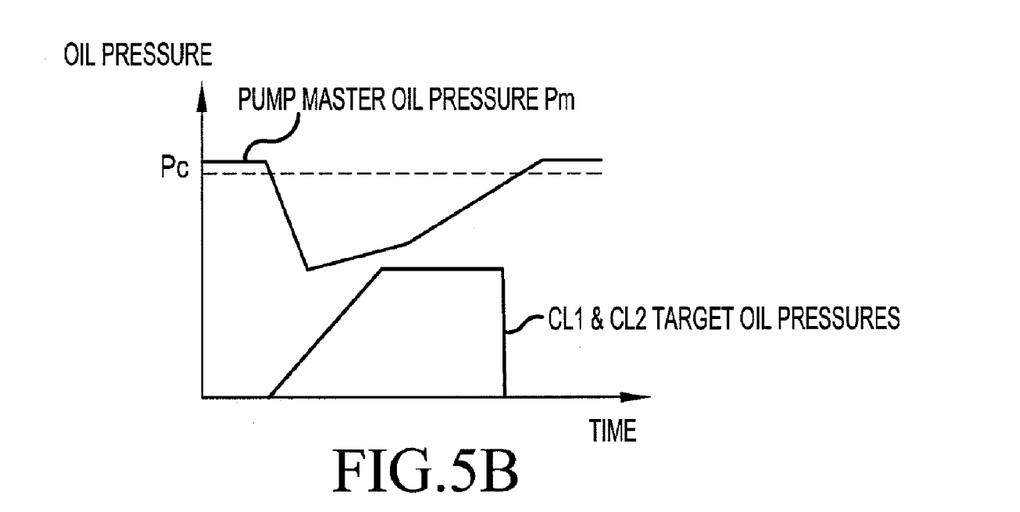

In addition, where the above-mentioned computation of the times to supply the oil pressures is not conducted and the oil pressures are supplied into the plurality of oil passages at the same time, the following problem may be generated. FIGS. 5(a) and 5(b) show graphs illustrating an example of the preparations for the driving of clutches in a twin-clutch type transmission having two hydraulic clutches CL1 and CL2. The clutches CL1 and CL2 are so configured that they show strokes in the directions for connection, attendantly on the supply of the oil pressures, and a predetermined oil pressure Pc is set at such a value that CL1 and CL2 show sufficient strokes, to be switched into a connected state. In this example, as preparations for driving of the clutches, the oil passages from which the working oil has been partly lost are again filled up with the working oil, and, for this purpose, it is aimed at generating the predetermined oil pressure Pc at each of CL1 and CL2. In addition, a master oil pressure Pm supplied from a hydraulic pump is set so as to have a little allowance (margin) in relation to the predetermined oil pressure Pc.

In this case, if the supplies of oil pressures to CL1 and CL2 are simultaneously started so as to realize the target oil pressure shown in FIG. 5(a), a working oil quantity, in excess of a supply quantity such that the hydraulic pump can maintain the master oil pressure Pm, is needed instantaneously. This results in that the master oil pressure Pm is lowered, and, as shown in FIG. 5(b), actual oil pressures generated at CL1 and CL2 do not conform to the target oil pressure, and the preparations for driving of the clutches are not carried out smoothly. In addition, although the lowering of the master oil pressure Pm can be prevented if the capacity of the hydraulic pump is increased sufficiently, it is undesirable to enlarge the hydraulic pump in order to secure the capacity that is needed only for the preparations for driving of the clutches.

SUMMARY AND OBJECTS OF THE INVENTION

The present invention has been made for solving the above-mentioned problems in the prior art. Accordingly, it is an object of an embodiment of the present invention to provide a clutch control system for a transmission which is capable of appropriately performing preparations for the driving of a plurality of clutches driven by oil pressures supplied from a hydraulic pump, at an engine starting time.

In order to attain the above object, according to an embodiment of the present invention a clutch control system for a transmission is provided having at least two hydraulic clutches. The clutch control system includes a hydraulic pump for supplying oil pressures for driving the hydraulic clutches; oil passages connected respectively to the hydraulic clutches so as to transmit the oil pressures; and a control unit for controlling the supplies of said oil pressures into said oil passages. Upon detection of a starting operation of an engine, the control unit performs an initial preparatory operation for making preparations for the driving of the hydraulic clutches by generating predetermined oil pressures in the oil passages. The initial preparatory operation is carried out by supplying the oil pressures into the oil passages at different timings.

In addition, according to an embodiment of the present invention the hydraulic clutches include two hydraulic clutches, one on one side and one on the other side.

In addition, according to an embodiment of the present invention the control unit, upon detection of the starting operation of the engine, starts supplying an oil pressure into the oil passage on one side, and starts supplying an oil pressure into the oil passage on the other side after the predetermined oil pressure is generated in the oil passage on one side.

Further, according to an embodiment of the present invention the transmission has a plurality of gear pairs between a main shaft and a counter shaft; the clutch on one side and the clutch on the other side are disposed on the main shaft and are operative to make and break transmission of a rotational driving force between the engine and the transmission. The main shaft includes an inner pipe for supporting odd-ordinal speed gears, and an outer pipe for supporting even-ordinal speed gears; the clutch on one side makes and breaks transmission of the rotational driving force to the inner pipe; and the clutch on the other side makes and breaks transmission of the rotational driving force to the outer pipe.

In addition, according to an embodiment of the present invention the clutch on one side supports at least a first speed gear serving as a lowest speed gear.

According to an embodiment of the present invention, a pipeline is connected to the hydraulic pump and a valve is connected to the oil passage on one side and the oil passage on the other side. The valve is so configured that the destination of the supply of the oil pressure generated in the hydraulic pump is changed over between the hydraulic pump and the oil passage on one side or the other side, based on a command from the control unit.

Furthermore, according to an embodiment of the present invention the detection of the starting operation of the engine is carried out by detecting that the rotating speed of the engine has exceeded a predetermined value.

According to an embodiment of the present invention, upon detection of the starting operation of the engine the control unit performs the initial preparatory operation for making preparations for the driving of the hydraulic clutches by generating predetermined oil pressures in the oil passages, and the initial preparatory operation is carried out by supplying the oil pressures into the oil passages at different timings. Therefore, the situation where the oil pressures are supplied into the oil passages at the same timing and an oil quantity in excess of the capacity of the hydraulic pump is needed is obviated in performing the initial preparatory operation, and the initial preparatory operation for the clutches can be carried out smoothly. This makes it possible to prevent an operational delay in relation to a first clutch driving command after the starting of the engine, and to enhance the response in regard of initial operations of the clutches. In addition, since it is unnecessary to supply the oil passages with the oil pressures at the same timing, the capacity of the hydraulic pump can be suppressed to a low level, and a smaller-sized transmission can be contrived. Further, by arbitrarily selecting the sequence in which the oil pressures are supplied at the time of the initial preparatory operation, the preparation for driving of an arbitrary one of the clutches can be started earlier than that of the other clutch.

According to an embodiment of the present invention, the hydraulic clutches include the two clutches consisting of the clutch on one side and the clutch on the other side. Therefore, in the twin-clutch type transmission having the clutch on one side and the clutch on the other side, the initial preparatory operation for the hydraulic clutches can be carried out appropriately.

According to an embodiment of the present invention, the control unit, upon detection of the starting operation of the engine, starts supplying an oil pressure into the oil passage on one side, and starts supplying an oil pressure into the oil passage on the other side after the predetermined oil pressure is generated in the oil passage on one side. Therefore, the preparation for the driving of the clutch on one side can be completed earlier, as compared with the case where both the clutches are supplied with the predetermined oil pressures at the same time. In addition, since the preparation for driving of the clutch on the other side is started after the preparation for driving of the clutch on one side is completed, the clutch on one side can be driven before the preparation for the driving of the clutch on the other side is completed.

According to an embodiment of the present invention, the transmission has a plurality of gear pairs between a main shaft and a counter shaft; the clutch on one side and the clutch on the other side are disposed on the main shaft and are operative to make and break the transmission of a rotational driving force between the engine and the transmission. The main shaft includes an inner pipe for supporting odd-ordinal speed gears, and an outer pipe for supporting even-ordinal speed gears. The clutch on one side makes and breaks transmission of the rotational driving force to the inner pipe and the clutch on the other side makes and breaks the transmission of the rotational driving force to the outer pipe. Therefore, in the twin-clutch type transmission in which the clutch on one side is in charge of odd-ordinal gear speeds and the clutch on the other side is in charge of even-ordinal gear speeds, the preparation for driving of the clutch on one side is completed early. This makes it possible to shorten the period of time necessary for the first speed gear, which is highly possibly used first after the starting of the engine, to be made usable.

According to an embodiment of the present invention, the clutch on one side supports at least a first speed gear serving as a lowest speed gear. Therefore, the period of time necessary for the lowest speed gear, which is highly frequently used at the time of vehicle starting, to be made usable is shortened, and a speedy vehicle starting after the starting of the engine can be achieved.

According to an embodiment of the present invention, a pipeline is connected to the hydraulic pump and a valve is connected to the oil passage on one side and the oil passage on the other side. The valve is so configured that the destination of supply of the oil pressure generated in the hydraulic pump is changed over between the hydraulic pump and the oil passage on one side or the other side, based on a command from the control unit. Therefore, in the transmission of the system in which the destination of supply of the oil pressure is selectively changed over between two clutches, the initial preparatory operation for the clutches can be carried out smoothly.

According to an embodiment of the present invention, the detection of the starting operation of the engine is carried out by detecting that the rotating speed of the engine has exceeded a predetermined value. Therefore, in the transmission in which the hydraulic pump is driven by a rotational driving force of the crankshaft, the initial preparatory operation for the clutches can be started after the supply of the oil pressure is started.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
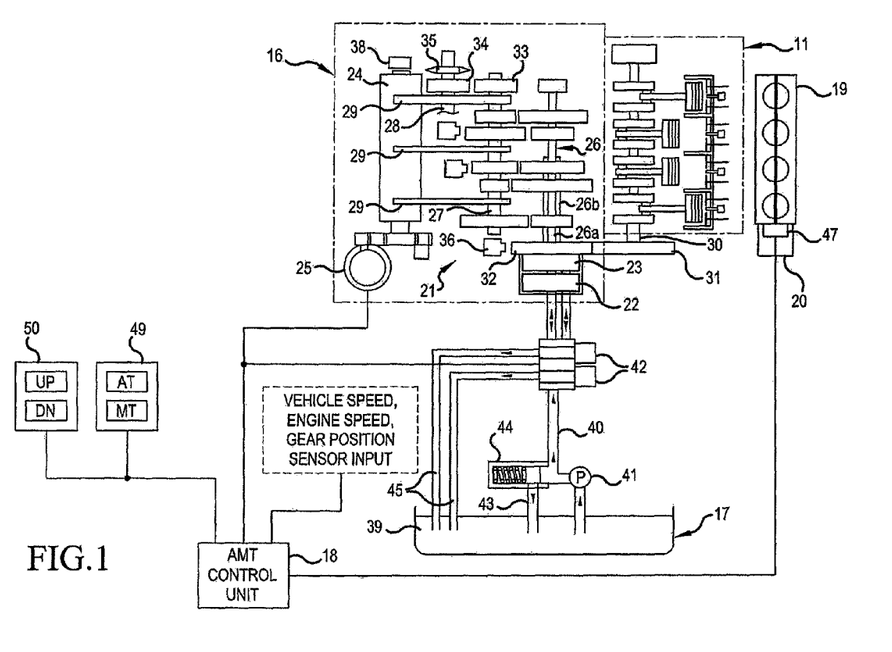
FIG. 1 is a system block diagram of an automatic/manual transmission applied to a motorcycle, and peripheral devices therefor, according to an embodiment of the present invention.

Now, a preferred embodiment of the present invention will be described below, referring to the drawings. FIG. 1 is a system block diagram of an automatic/manual transmission (hereinafter referred to as AMT) as an automatic transmission applied to a motorcycle and peripheral devices for the transmission. The AMT 16 connected to an engine 11 is controlledly driven by a clutch hydraulic system 17 and an AMT control unit 18 as a transmission controller. The engine 11 has a throttle-by-wire type throttle body 19, and the throttle body 19 is provided with a motor 20 for opening and closing the throttle.

The AMT 16 includes transmission gears 21 for a multiplicity of gear speeds, a first clutch 22, a second clutch 23, a shift drum 24, and a shift control motor 25 for turning the shift drum 24. A multiplicity of gears constituting the transmission gears 21 are respectively connected to or loosely fitted over a main shaft 26, a counter shaft 27, and a transmission gear output shaft 28. The main shaft 26a includes an inner main shaft 26a and an outer main shaft 26b. The inner main shaft 26a is connected to the first clutch 22, while the outer main shaft 26b is connected to the second clutch 23. The main shaft 26 and the counter shaft 27 are provided with clutches (not shown) capable of being displaced in the axial directions of the main shaft 26 and the counter shaft 27, and end parts of shift forks 29 are engaged respectively with the clutches and a camshaft (not shown) formed on the shift drum 24.

To an output shaft of the engine 11, i.e., a crankshaft 30, a primary drive gear 31 is connected, and the primary drive gear 31 is meshed with a primary driven gear 32. The primary driven gear 32 is connected to the inner main shaft 26a through the first clutch 22, and connected to the outer main shaft 26b through the second clutch 23.

A counter shaft output gear 33 connected to the counter shaft 27 is meshed with an output driven gear 34 connected to the transmission gear output shaft 28. A drive sprocket 35 is connected to the transmission gear output shaft 28, and a driving force is transmitted to a rear wheel, serving as a drive wheel, through a drive chain (not shown) wrapped around the drive sprocket 35. In addition, the AMT 16 is provided therein with an engine speed sensor 36 disposed opposite to the periphery of the primary driven gear 32, and with a gear position sensor 38 for detecting the current gear position on the basis of the rotational position of the shift drum 24. In addition, the throttle body 19 is provided with a throttle sensor 47 for outputting a throttle position signal.

The clutch hydraulic system 17 includes an oil tank 39, and a pipeline 40 for feeding oil in the oil tank 39 to the first clutch 22 and the second clutch 23. A hydraulic pump 41 and a valve 42 are provided on the pipeline 40, and a regulator 44 is disposed on a return pipeline 43 connected to the pipeline 40. The valve 42 is so structured as to be able to individually exert oil pressures on the first clutch 22 and on the second clutch 23. In addition, the valve 42 is also provided with oil return pipelines 45.

A mode switch 49 for switching between an automatic transmission (AT) mode and a manual transmission (MT) mode and a shift selection switch 50 for commanding a shift-up (UP) or a shift-down (DN) are connected to the AMT control unit 18. The AMT control unit 18 has a microcomputer (CPU), and is configured so as to be able to control the valve 42 and the shift control motor 25 according to output signals from various sensors and switches, and be able to change over the gear position in the AMT 16 automatically or semi-automatically.

When an AT mode is selected, the AMT control unit 18 automatically changes over the transmission gears 21 according to such data as vehicle speed, engine speed, throttle position, etc. On the other hand, when an MT mode is selected, the AMT control unit 18 shifts up or shifts down the transmission gears 21 attendantly on a shift operation of the selection switch 50. In addition, even when the MT mode is selected, such a setting can be made so as to carry out an auxiliary automatic transmission control for preventing over-rotation or stall of the engine from occurring.

In the clutch hydraulic system 17, oil pressure is exerted on the valve 42 by the hydraulic pump 41, and the oil pressure is controlled by the regulator 44 so as not to exceed an upper limit. When the valve 42 is opened by a command from the AMT control unit 18, the oil pressure is applied to the first clutch 22 or the second clutch 23, and the primary driven gear 32 is connected to the inner main shaft 26a or the outer main shaft 26b through the first clutch 22 or the second clutch 23. When the valve 42 is closed and the application of the oil pressure is stopped, the first clutch 22 and the second clutch 23 are urged by return springs (not shown) incorporated therein in such directions that the clutches are disconnected from the inner main shaft 26a and the outer main shaft 26b.

The shift control motor 25 turns the shift drum 24 according to a command from the AMT control unit 18. When the shift drum 24 is turned, the shift forks 29 are displaced in the axial direction of the shift drum 24 according to the shapes of the cam grooves formed in the outer periphery of the shift drum 24, to move the clutches, whereby the meshing between the gears on the counter shaft 27 and the main shaft 26 is changed, and the transmission gears 21 are shifted up or down.

Figure 2:
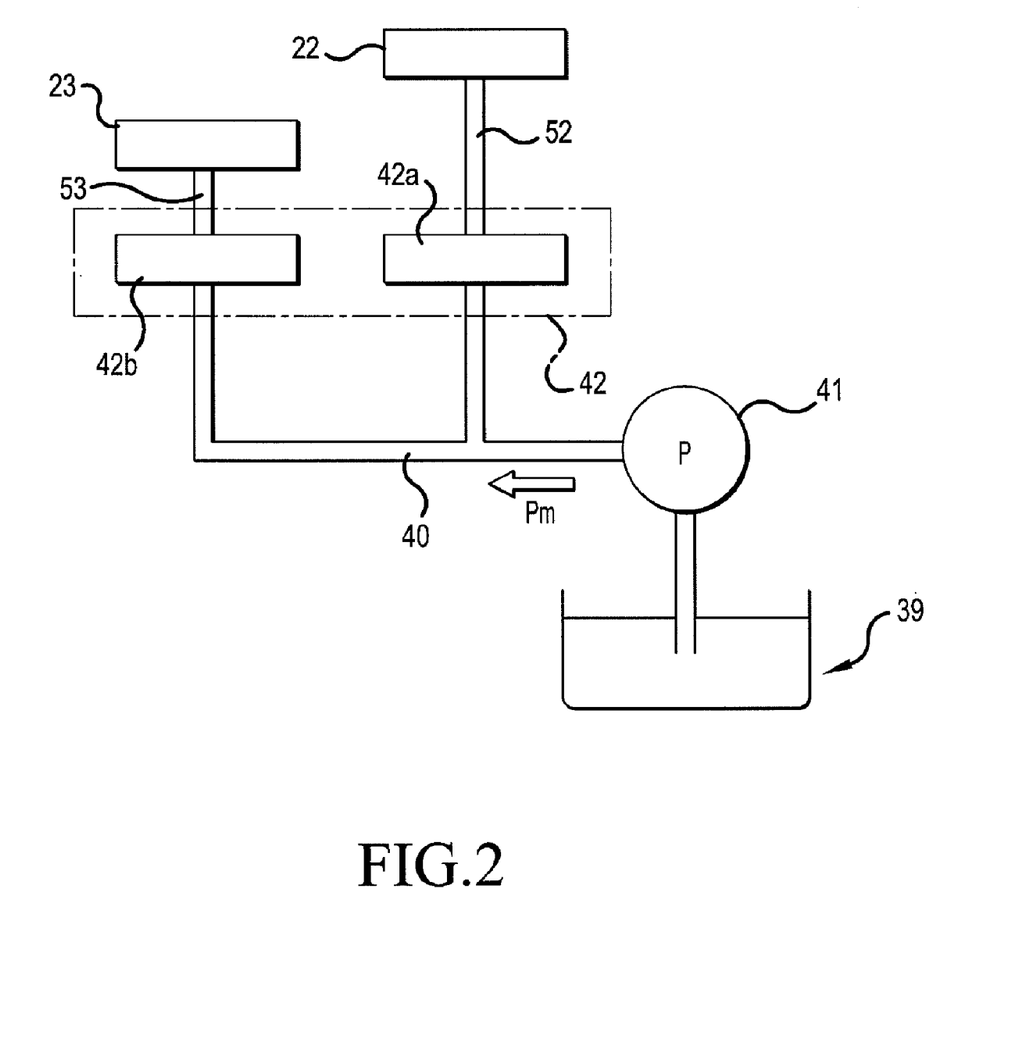
FIG. 2 is an enlarged view of a part of FIG. 1, showing a configuration of the periphery of an oil pressure supplying part.

FIG. 2 is an enlarged view of a part of FIG. 1, showing the configuration in the periphery of an oil pressure supplying part. The same reference symbols as used above denote parts which are the same as or equivalent to those shown above. During an engine operation, a master oil pressure Pm regulated by the regulator 44 (see FIG. 1) is generated in the hydraulic pump 41, and the master oil pressure Pm is supplied through the pipeline 40 to the valve 42. The valve 42 is composed of a first pressure control valve 42a for controlling the supply of an oil pressure to the first clutch 22, and a second pressure control valve 42b for controlling the supply of an oil pressure to the second clutch 23. Both the pressure control valves 42a and 42b are opened by driving commands sent from the AMT control unit 18. When the first pressure control valve 42a is driven and the master oil pressure Pm is supplied into an oil passage 52, the first clutch 22 is driven and switched into a connected state. On the other hand, when the second pressure control valve 42b is driven and the master oil pressure Pm is supplied into an oil passage 53, the second clutch 23 is switched into a connected state. In addition, the operation of the valve 42 according to this embodiment includes three patterns, namely, a pattern in which the first pressure control valve 42a is energized so as to supply the oil pressure into the oil passage 52, a pattern in which the second pressure control valve 42b is energized so as to supply the oil pressure into the oil passage 53, and a pattern in which energization of both the pressure control valves 42a and 42b is stopped so as to stop the supply of the oil pressure. In the condition where the supply of the oil pressure is stopped, the first clutch 22 and the second clutch 23 are both disconnected, resulting in a neutral condition where the rotational driving force of the engine is not transmitted.

The AMT 16 according to this embodiment is so configured that the inner main shaft 26a (see FIG. 1) connected to the first clutch 22 supports odd-ordinal speed gears (first, 3rd, and 5th speed gears), while the outer main shaft 26b (see FIG. 1) connected to the second clutch 23 support even-ordinal speed gears (2nd, and 4th speed gears). For example, when the vehicle is operating with an odd-ordinal speed gear selected, the supply of the oil pressure to the first clutch 22 is continued and the first clutch 22 is thereby kept in the connected state. When shift changes are sequentially carried out, the connected/disconnected states of the first clutch 22 and the second clutch 23 are changed over alternately.

The oil passages 52 and 53 are always filled with a working oil during the engine operation. Therefore, the master oil pressure Pm in the hydraulic pump 41 can be instantaneously transmitted to the first clutch 22 and the second clutch 23 according to a control of the driving of the valve 42. However, the working oil filling the oil passages 52 and 53 is used for lubrication between the inner main shaft 26a and the outer main shaft 26b (see FIG. 1) slid and rotated relative to each other and, simultaneously, circulated through various parts of the engine. Therefore, when the supply of the oil pressure from the hydraulic pump 41 is stopped attendant on the stopping of the engine, the working oil filling up the oil passages 52 and 53 for the purpose of transmitting the oil pressure is lost little by little from the oil passages due to leakage through gaps present in lubricated parts, leakage from hydraulic devices, or the like, with the lapse of time.

When the engine 11 is started from the condition where the working oil has slightly escaped from any of the oil passages 52 and 53, even if the master oil pressure Pm is supplied from the hydraulic pump 41 according to a first clutch driving command, it takes a little time for the oil passages to be again filled up with the working oil, so that there is a possibility of a delay in the clutch operation. In order to obviate the delay in the clutch operation, it suffices to perform a preparation for driving wherein the oil pressure is supplied so as to fill up the oil passages 52 and 53 with the working oil before the first clutch driving command is issued. In the clutch control system for a transmission according to the present invention, it is a characteristic feature that, corresponding to the presence of the two hydraulic clutches consisting of the first clutch 22 on one side and the second clutch 23 on the other side, oil pressures are supplied to the oil passages 52 and 53 at different timings, in performing an initial preparatory operation for preparing for the driving of the clutches.

Figure 3A:
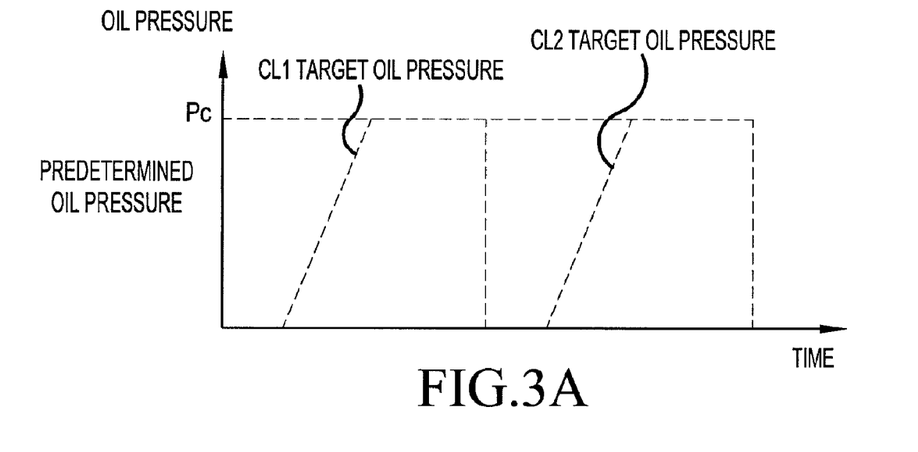
FIGS. 3(a) and 3(b) show graphs illustrating oil pressure supplying methods for an initial preparatory operation according to an embodiment of the present invention.
Figure 3B:
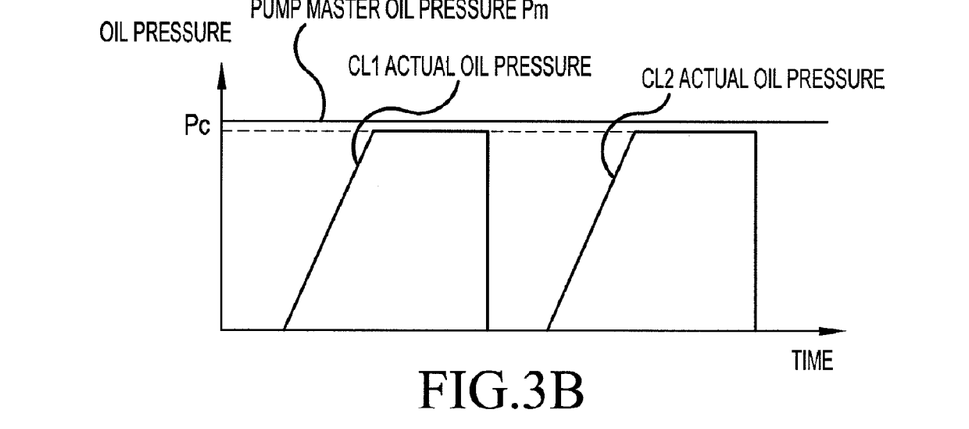

FIGS. 3(a) and 3(b) show graphs illustrating oil pressure supplying methods for the initial preparatory operation according to an embodiment of the present invention. FIG. 3(a) shows target oil pressures for the first clutch 22 (hereinafter referred to as CL1) and the second clutch 23 (hereinafter referred to as CL2) in the initial preparatory operation. FIG. 3(b) shows actual oil pressures actually generated in CL1 and CL2.

In this embodiment, a predetermined oil pressure Pc is set at such a pressure that CL1 and CL2 show sufficient strokes and are securely switched into the connected state. In addition, since the AMT 16 according to this embodiment is so configured that CL1 supports the odd-ordinal speed gears and CL2 supports the even-ordinal speed gears, there is no possibility that the two clutches might be simultaneously put into the connected state during normal operation of the vehicle.

Therefore, it suffices for the master oil pressure Pm in the hydraulic pump 41 to be able to securely drive one of the two clutches. Thus, the master oil pressure Pm is set at a value with some allowance in relation to the predetermined oil pressure Pc.

When the oil pressures in CL1 and CL2, or the oil pressures in the oil passages 52 and 53, have reached the predetermined oil pressure Pc, it can be judged that the oil passages have again been filled up with the working oil. In the example shown in FIG. 3(b), when the engine starting operation is detected, the AMT control unit 18 first drives the valve 42 so as to start the supply of an oil pressure to CL1, and cause CL1 to reach the predetermined oil pressure Pc, thereby completing the preparation for driving of CL1. Next, CL2 is caused to reach the predetermined oil pressure Pc, thereby completing the preparation for driving of CL2. By this, the initial preparatory operation for the two clutches CL1 and CL2 is completed.

As above-mentioned, according to the oil pressure supplying method in this embodiment, the initial preparatory operation is carried out by supplying the oil pressures to CL1 and CL2, namely, into the oil passages 52 and 53 at different timings. This makes it possible to generate the actual oil pressures conforming to the target oil pressures at CL1 and CL2, even in the case of a transmission such that the master oil pressure Pm would be lowered if the oil pressures are simultaneously supplied to CL1 and CL2. Consequently, the preparation for driving of the clutches can be smoothly carried out.

In addition, since the AMT 16 according to this embodiment is so configured that CL1 is in charge of the odd-ordinal gear speeds while CL2 is in charge of the even-ordinal gear speeds, when the preparation for driving of CL1 is completed earlier, it is possible to shorten the time necessary for the first speed gear (lowest speed gear), which is highly possibly used at the time of vehicle starting after the starting of the engine, to become usable, and to achieve a swift vehicle starting after the starting of the engine. In addition, the duration of the supply of the oil pressures to CL1 and CL2 by the AMT control unit 18 can be set according to the lapse of time (for example, 0.5 sec) from the start of driving of the valve 42, instead of judging whether or not the oil pressures at CL1 and CL2 have actually reached the predetermined oil pressure Pc.

Figure 4:
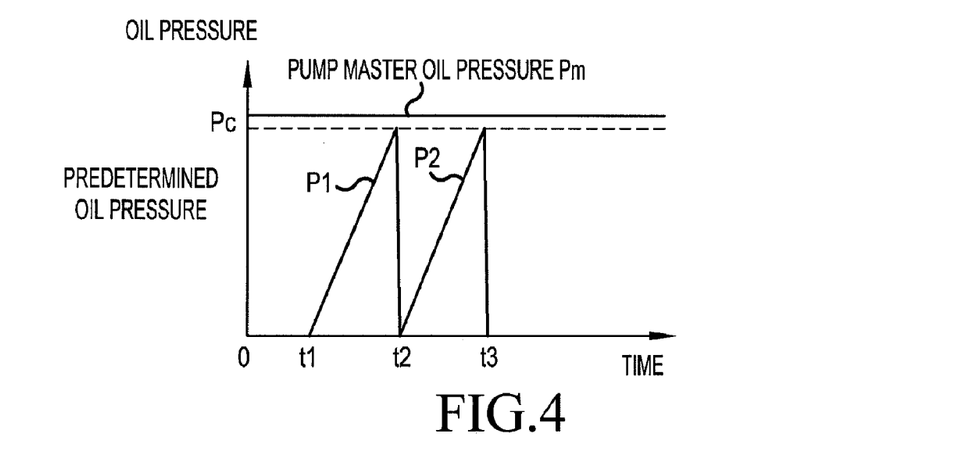
FIG. 4 shows a graph illustrating an oil pressure supplying method for the initial preparatory operation according to a modified example of the configuration of the present invention.

FIG. 4 is a graph illustrating an oil pressure supplying method for the initial preparatory operation according to a modified example of the embodiment of the present invention. The same reference symbols as used above denote parts the same as or equivalent to those shown above. In this modified example, also, an oil pressure is supplied to CL1 earlier as an initial preparatory operation, and thereafter an oil pressure is supplied to CL2, in the same manner as in the above-described embodiment. This modified example is characterized in that the supply of the oil pressure to CL1 is started at time t1, and the supply of the oil pressure to CL2 is started simultaneously when the oil pressure P1 at CL1 reaches the predetermined oil pressure Pc at time t2. Therefore, the preparation for driving of CL1 is completed, and the first speed gear is thereby made selectable, at time t2, and then the preparation for driving of CL2 is completed at time t3. Consequently, the initial preparatory operation for CL1 and CL2 is completed in a minimized period of time.

As has been described above, according to the clutch control system for a transmission based on the present invention, upon detection of an engine starting operation, oil pressures are supplied to at least two different timings into oil passages arranged for supplying oil pressures to hydraulic clutches. Therefore, the situation in which oil pressures are supplied into the oil passages at the same timing and hence an oil quantity in excess of the capacity of a hydraulic pump is demanded can be obviated, and an initial preparatory operation for the clutches can be smoothly carried out. This makes it possible to prevent an operational delay with respect to a first clutch driving command after engine starting, and to enhance the response in regard of an initial clutch operation. In addition, since there is no need to supply oil pressures into the oil passages at the same timing, the capacity of the hydraulic pump can be suppressed to a low level, and a smaller-sized transmission can be contrived.

In addition, the configurations of the transmission, the hydraulic pump and the valve, the relation between the master oil pressure of the hydraulic pump and the predetermined oil pressure, the times to supply the oil pressures to the clutches in the initial preparatory operation, the sequence in which the oil pressures are supplied to the plurality of clutches, etc. are not limited to those in the above-described embodiment, and may be modified variously. For example, in the case where three hydraulic clutches are provided, the sequence in which oil pressures are supplied to the plurality of clutches may be arbitrarily set, for instance, the oil pressure is supplied to one clutch earlier, and thereafter the oil pressures are supplied to the other two clutches at the same timing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch control system for a transmission having at least two hydraulic clutches, said clutch control system comprising:
   a hydraulic pump for supplying oil pressures for driving said hydraulic clutches;
   oil passages connected respectively to said hydraulic clutches for transmitting said oil pressures; and
   a control unit for controlling the supplies of oil pressures into said oil passages;
   an engine speed sensor for detecting an engine starting operation and communicating the engine starting operation signal to the control unit,
   wherein after receiving the engine starting operation signal and prior to driving said hydraulic clutches, said control unit is configured to perform an initial preparatory operation for making preparations for driving said hydraulic clutches by generating a predetermined oil pressure (Pc) in each of said oil passages; and
   said initial preparatory operation is carried out by supplying said predetermined oil pressures (Pc) into each of said oil passages at different timings, one after the other, and prior to driving said hydraulic clutches.

2. The clutch control system for the transmission as set forth in claim 1, wherein said hydraulic clutches include two hydraulic clutches, one on one side and one on the other side.

3. The clutch control system for the transmission as set forth in claim 2, wherein after receiving the engine starting operation signal from the engine speed sensor and prior to driving said hydraulic clutches, said control unit starts supplying an oil pressure into said oil passage on one side, and starts supplying an oil pressure into said oil passage on the other side after said predetermined oil pressure (Pc) is generated in said oil passage on the one side.

4. The clutch control system for the transmission as set forth in claim 2, wherein:
   said transmission has a plurality of gear pairs between a main shaft and a counter shaft;
   said clutch on the one side and said clutch on the other side are disposed on said main shaft and are operative to permit and to prevent the transmission of a rotational driving force between said engine and said transmission;
   said main shaft includes an inner pipe for supporting odd-ordinal speed gears, and an outer pipe for supporting even-ordinal speed gears;
   said clutch on the one side permits and prevents the transmission of said rotational driving force to said inner pipe; and
   said clutch on the other side permits and prevents the transmission of said rotational driving force to said outer pipe.

5. The clutch control system for the transmission as set forth in claim 3, wherein:
   said transmission has a plurality of gear pairs between a main shaft and a counter shaft;
   said clutch on the one side and said clutch on the other side are disposed on said main shaft and are operative to permit and to prevent the transmission of a rotational driving force between said engine and said transmission;
   said main shaft includes an inner pipe for supporting odd-ordinal speed gears, and an outer pipe for supporting even-ordinal speed gears;
   said clutch on the one side permits and prevents the transmission of said rotational driving force to said inner pipe; and
   said clutch on the other side permits and prevents the transmission of said rotational driving force to said outer pipe.

6. The clutch control system for the transmission as set forth in claim 4, wherein said clutch on the one side supports at least a first speed gear serving as a lowest speed gear.

7. The clutch control system for the transmission as set forth in claim 5, wherein said clutch on the one side supports at least a first speed gear serving as a lowest speed gear.

8. The clutch control system for the transmission as set forth in claim 3, wherein:
   a pipeline is connected to said hydraulic pump and a valve is connected to said oil passage on the one side and said oil passage on the other side; and
   said valve is so configured that a destination of supply of the oil pressure generated in said hydraulic pump is changed over between said hydraulic pump and said oil passage on one side or the other side, based on a command from said control unit.

9. The clutch control system for the transmission as set forth in claim 4, wherein:
   a pipeline is connected to said hydraulic pump and a valve is connected to said oil passage on the one side and said oil passage on the other side; and
   said valve is so configured that a destination of supply of the oil pressure generated in said hydraulic pump is changed over between said hydraulic pump and said oil passage on one side or the other side, based on a command from said control unit.

10. The clutch control system for the transmission as set forth in claim 8, further comprising:
    a regulator disposed on a return pipeline connected to the pipeline,
    wherein the valve is so structured as to be able to individually exert oil pressures on each of the hydraulic clutches, and the valve is provided with a pair of oil return pipelines.

11. The clutch control system for the transmission as set forth in claim 1, wherein said engine speed sensor detects said engine starting operation by detecting that a rotating speed of said engine has exceeded a predetermined value.

12. The clutch control system for the transmission as set forth in claim 2, wherein said engine speed sensor detects said engine starting operation by detecting that a rotating speed of said engine has exceeded a predetermined value.

13. The clutch control system for the transmission as set forth in claim 3, wherein said engine speed sensor detects said starting operation of said engine is carried out by detecting that a rotating speed of said engine has exceeded a predetermined value.

14. The clutch control system for the transmission as set forth in claim 4, wherein said engine speed sensor detects said engine starting operation by detecting that a rotating speed of said engine has exceeded a predetermined value.

15. The clutch control system for the transmission as set forth in claim 6, wherein said engine speed sensor detects said engine starting operation by detecting that a rotating speed of said engine has exceeded a predetermined value.

16. The clutch control system for the transmission as set forth in claim 8, wherein said engine speed sensor detects said engine starting operation by detecting that a rotating speed of said engine has exceeded a predetermined value.

17. A clutch control system for a transmission comprising:
a first hydraulic clutch;
a second hydraulic clutch;
a hydraulic pump operatively connected to said first and second hydraulic clutches for supplying oil pressure for driving said first and second hydraulic clutches;
a first oil passage operatively connected between said hydraulic pump and said first hydraulic clutch for transmitting said oil pressure thereto;
a second oil passage operatively connected between said hydraulic pump and said second hydraulic clutch for transmitting said oil pressure thereto:
a control unit for controlling the supplies of oil pressures into said first and second oil passages;
an engine speed sensor for detecting an engine starting operation and communicating the engine starting operation signal to the control unit;
wherein upon detection of the engine starting operation and prior to driving said hydraulic clutches, said control unit is configured to perform an initial preparatory operation for making preparations for driving said hydraulic clutches by generating a predetermined oil pressure (Pc) in each said first and second oil passages; and
said initial preparatory operation is carried out by supplying predetermined oil pressures (Pc) into each of said first and second oil passages at different timings, one after the other, prior to driving said hydraulic clutches.

18. The clutch control system for the transmission as set forth in claim 17, wherein said first and second hydraulic clutches are provided one on one side and one on the other side.

19. The clutch control system for the transmission as set forth in claim 18, wherein after receiving the engine starting operation signal from the engine speed sensor and prior to driving said hydraulic clutches, said control unit starts supplying an oil pressure into said first oil passage on one side, and starts supplying an oil pressure into said second oil passage on the other side after said predetermined oil pressure (Pc) is generated in said first oil passage on the one side.

20. The clutch control system for the transmission as set forth in claim 18, wherein:
said transmission has a plurality of gear pairs between a main shaft and a counter shaft;
said first hydraulic clutch on the one side and said second hydraulic clutch on the other side are disposed on said main shaft and are operative to permit and to prevent the transmission of a rotational driving force between said engine and said transmission;
said main shaft includes an inner pipe for supporting odd-ordinal speed gears, and an outer pipe for supporting even-ordinal speed gears;
said first hydraulic clutch on the one side permits and prevents the transmission of said rotational driving force to said inner pipe; and
said second hydraulic clutch on the other side permits and prevents the transmission of said rotational driving force to said outer pipe.

\* \* \* \* \*